May 17, 1966 L. W. JOHNSON ETAL 3,251,513
SHELLED PEANUT PLANTING MECHANISM
Filed Oct. 24, 1963 3 Sheets-Sheet 1

INVENTORS.
LESLIE W. JOHNSON
GEORGE H. SHRIVER
BY
ATTORNEY

May 17, 1966     L. W. JOHNSON ETAL     3,251,513

SHELLED PEANUT PLANTING MECHANISM

Filed Oct. 24, 1963     3 Sheets-Sheet 2

INVENTORS.
LESLIE W. JOHNSON
GEORGE H. SHRIVER

BY

ATTORNEY

May 17, 1966 L. W. JOHNSON ETAL 3,251,513
SHELLED PEANUT PLANTING MECHANISM
Filed Oct. 24, 1963 3 Sheets-Sheet 3

INVENTORS.
LESLIE W. JOHNSON
GEORGE H. SHRIVER
BY

ATTORNEY

# United States Patent Office 3,251,513
Patented May 17, 1966

3,251,513
SHELLED PEANUT PLANTING MECHANISM
Leslie W. Johnson and George H. Shriver, Moline, Ill., assignors to Deere & Company, Moline, Ill., a corporation of Delaware
Filed Oct. 24, 1963, Ser. No. 318,563
11 Claims. (Cl. 222—328)

The present invention relates generally to agricultural implements and more particularly to planters and the like.

The object and general nature of the present invention is the provision of a shelled peanut planting mechanism able to handle large volumes of peanuts with minimum breakage. More specifically, it is a feature of the present invention to provide a mechanism for dribbling peanuts and other similar seeds through an opening in the bottom of the seed hopper whereby the seed may be planted at high rates and with less breakage than is possible with conventional seed selecting mechanisms.

In prior art devices for planting peanut seeds and the like it has generally been conventional to individually select seeds by employing rotating seed plates. In a planter employing a single seed plate, it has in the past been possible to plant a maximum of eighty pounds of peanuts per acre at three miles per hour with seed breakage in the range of two percent. When it has been desirable to plant at heavier rates it has been necessary to double plant, that is to go over the field twice with the same planting mechanism. Also, when planting at high rates, as for example eighty pounds, with the conventional planter the breakage is considered excessive, the breakage being caused by the high rotational speed of the seed plates. Thus the prior art is limited with respect to breakage, speed and application in pounds per acre.

It is an object of the present invention to overcome the foregoing disadvantages by employing a mechanism which does not rely on individual seed selection in the metering of the seed. More specifically it is an object of the present invention to provide a mechanism for generating a generally uniform thin relatively fast moving stream of seeds which are progressively planted, the stream being preferably formed of individual peanuts disposed in end-to-end relationship. To this end a thick, slow moving stream of seeds is progressively speeded up and consequently thinned, the peanuts which form the thinned stream being dribbled out of the seed metering device and subsequently planted. By planting from a relatively fast moving, thin stream instead of a slow, thin stream, more uniform seed spacing may be achieved.

According to applicants' preferred embodiment, it is a particular object of the present invention to provide a special mechanism for seed hoppers of a conventional design wherein a rotating member is substituted for the seed plate, and an upper member that cooperates with the rotating member is held in a fixed position in the seed hopper directly above the rotating member, the fixed member having a spirally shaped groove in its lower surface extending from a point near the center of the fixed member to a point adjacent the discharge of the seed hopper, the spiral groove being open to the seed in the hopper near the center of the hopper.

More specifically, it is a feature of the invention to provide a stationary peanut cut-off plate and a rotating peanut plate below the stationary plate, and so constructed and arranged that peanuts from the hopper flow through an orifice in the stationary plate near the center of the hopper onto the rotating plate below. The rotating peanut plate has a sloping surface which is higher at the center than at the outside diameter. The rotation of the peanut plate plus the sloping surface causes the peanuts to be carried in a gradually thinning and faster moving stream to the discharge point. The discharge point is in the area normally occupied by the picker wheel and cotton gate in a conventional planter.

With this proposed structure it is possible to plant at rates from fifty to one hundred and fifty pounds and over per acre, to plant at speeds as high as seven miles an hour, and to plant at high speeds and rates with breakage in the range of less than one percent to one-quarter percent. Thus by using this mechanism, applicants can plant twice the acreage with twice the quantity of seed with less than one-half the breakage than is possible with the conventional planter of today.

These and other objects and advantages of this invention will be apparent to those skilled in the art after consideration of the following detailed description, taken in conjunction with the accompanying drawings, in which the preferred form of this invention is illustrated.

Figure 1:
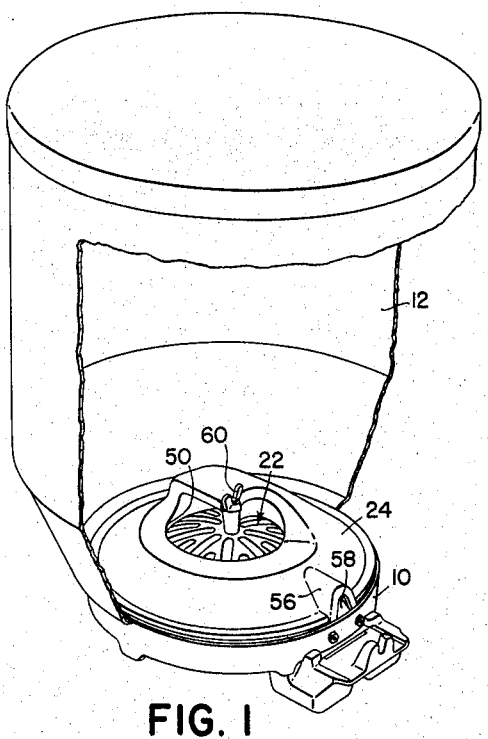
FIG. 1 is a perspective view of a conventional seed hopper provided with the mechanism of this invention.

The shelled peanut planting mechanism of the present invention is shown for purposes of illustration as assembled in a planter having a base or hopper bottom 10 on which a hopper or seed container 12 is carried in any suitable way. The hopper bottom 10 is conventionally connected in detachable fashion to a supporting structure (not shown). The arrangement is generally similar to that shown in U.S. Patent 2,385,668 to C. H. White, which issued on September 25, 1945, and U.S. Patent 2,946,490 which issued on July 26, 1960, to H. V. Hansen.

The hopper bottom 10 is provided with suitable drive shaft means 14 (FIG. 4) carrying a pinion 16 which engages with the drive member 18 (FIG. 3) that normally forms a permanent part of the hopper bottom 10. The drive shaft 14 is driven through sprocket 19 in a conventional manner. The hopper bottom 10 also includes an opening 20 through which selected seed may fall downwardly through the seed passage of an associated planter shank.

Figure 3:
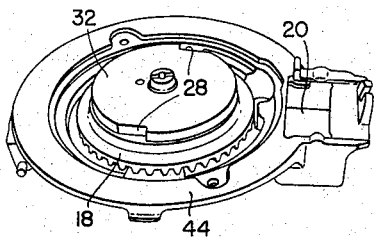
FIG. 3 is a bottom view of the seed hopper without the conventional seed plates or the mechanism of this invention.
Figure 4:
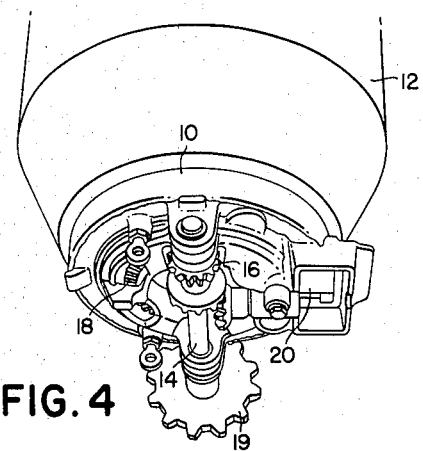
FIG. 4 is a view of the underneath side of the seed hopper.

According to the principles of the present invention, the peanut planter mechanism includes a rotatable member 22 and a fixed member 24. In normal operative position the lower or rotatable member 22 is disposed in the lower portion of the planter hopper 12 between the upper or fixed member 24 and the drive member 18, as can be seen from FIG. 1. The rotatable member 22 is provided with drive lugs 26 (FIG. 8) which are adapted to be received in the drive notches 28 in the upper portion 32 of the drive member 18 (FIG. 3). Also provided on the lower rotatable member 22 is a plurality of centering lugs 30 which are adapted to be disposed outside the upper portion 32 of the drive member 18. Support lugs 34 are also provided on the bottom of the lower member 22, the support lugs engaging the top surface of the upper portion 32. The top of the lower member 22 is generally curved downwardly away from a central portion and is provided with a centrally disposed aperture 36 for reasons to be more fully described below.

On the upper surface of the member 22 is a plurality of radially extending grooves 38.

Figure 5:
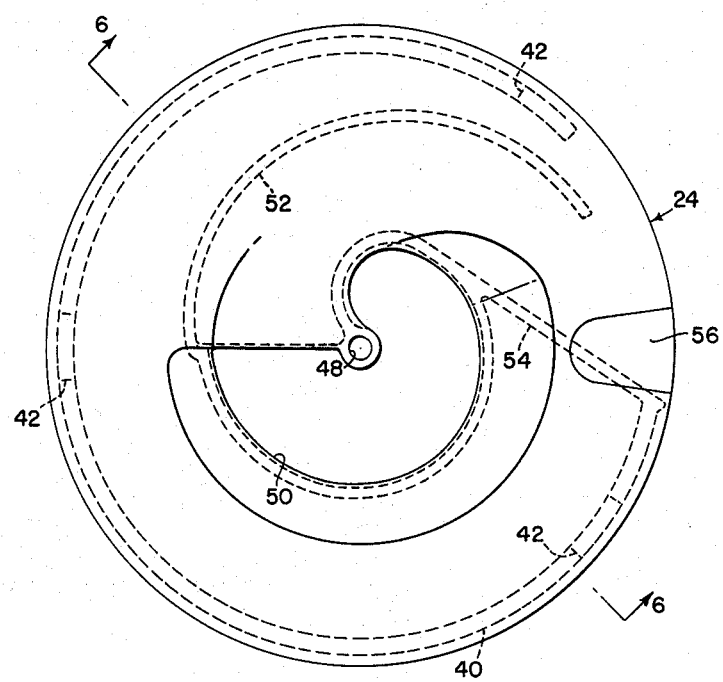
FIG. 5 is an enlarged top view of the upper member of applicants' mechanism.
Figure 6:
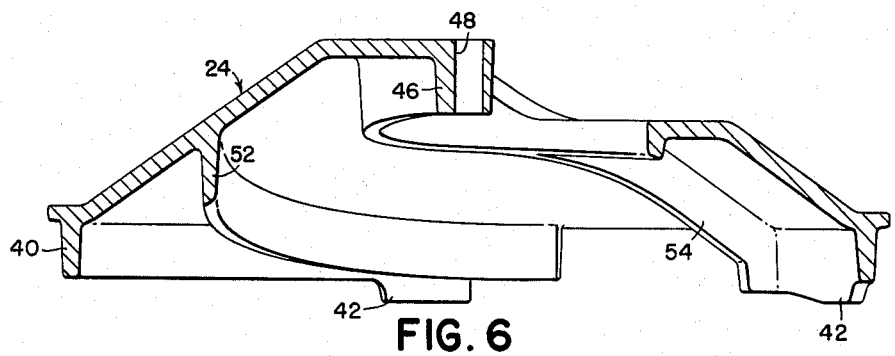
FIG. 6 is a section taken along the line 6—6 of FIG. 5.
Figure 7:
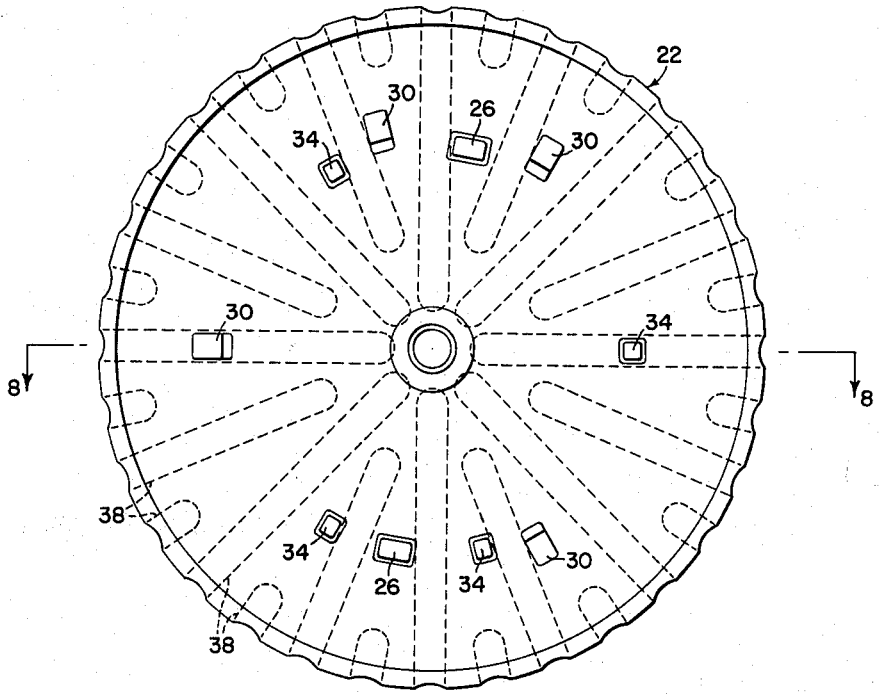
FIG. 7 is a bottom or underside view of the lower portion or rotary bottom member of applicants' mechanism on a slightly larger scale than FIG. 5.

The upper fixed member 24 (FIGS. 5 and 6) is generally conical in shape and has a lower circular flange 40 which has depending leg portions 42 which are adapted to be disposed on the flange 44 of the hopper bottom 10. A depending lug 46, provided with an aperture 48, is centrally located on the upper member. An aperture 50 is provided on the top portion of the conical member and extends approximately 270° about the depending lug 46 as can best be seen from FIG. 5. A depending spirally shaped flange 52 extends from the lug 46 and defines the outer edge of the large aperture 50 and extends around substantially to the edge of the conical member 24. A second flange 54 extends angularly from the first flange 52 to the circular flange 40. An arch 56 (FIG. 1) extends radially outwardly from a lower portion of the conical upper surface and is adapted to engage a centering pin to hold the upper member 24 in a fixed nonrotating position. As will be seen from FIG. 2, the centering pin, shown at 58, comprises an angled casting fixed by screws 59 or the like to the adjacent portion of the hopper bottom 10.

To assemble the mechanism of this invention it is only necessary to remove the false ring and seed plate with which a conventional planter is equipped, to mount the lower member 22 on the drive member 18 with the drive lugs 26 being disposed in the drive notches 28, and to mount the upper member 24 above the lower member with the legs 42 of the upper member engaging the flange 44 of the seed can and the arch 56 being disposed over the centering pin 58. The parts are held in their assembled position by a conventional thumb screw 60, and in their assembled position the lower end of the spiral flange is disposed above the opening 20 (FIG. 3).

Figure 2:
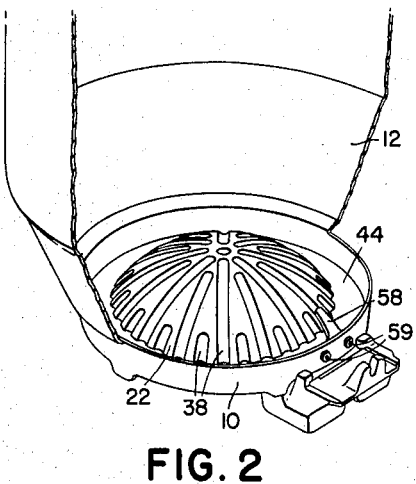
FIG. 2 is a view similar to FIG. 1 in which the stationary plate of the mechanism of this invention has been removed.
Figure 8:
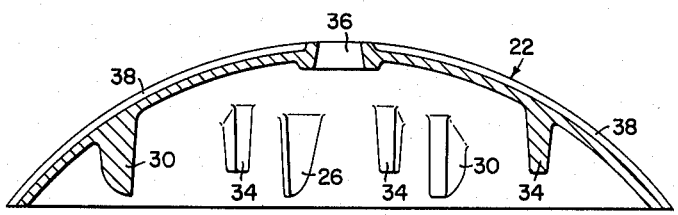
FIG. 8 is a section taken along the line 8—8 of FIG. 7.

In operation, the shelled peanuts in the hopper 12 will tend to pass through the aperture 50 in the upper fixed member 24 in a relatively slow moving thick stream and contact the lower rotating member 22, the lower member rotating in a clockwise direction as viewed in FIGS. 1 and 2. As best seen in FIG. 8, the rotating member 22 has a surface which is progressively inclined from a high point at the center to a relatively steeply angled portion at the outside diameter. Gravity will cause the individual peanuts to lie against the inner edge of the flange 52, and the rotation of the lower member 22 plus the sloping surface causes the peanuts to be carried in a gradually thinning and faster moving stream along the spiral flange to the discharge point 20. The flange 54 insures that the peanuts will not be carried past the discharge point. While the peanuts discharged from the fast, thin stream are not perfectly uniformly spaced apart, the spacing is sufficiently uniform for the planting of peanuts. Thus applicants by abandoning the principle of individually selecting the seeds, have made it possible to greatly improve planting speeds and rates while reducing breakage. To vary the rate of discharge it is only necessary to vary the speed of the rotating member. This may be done in any conventional manner, as for example by employing sprockets having more or less teeth than the sprocket 19. It should be noted that the speed of rotation of the lower member controls both the rate at which the peanuts will be discharged from the thin stream, as well as the speed of the thick stream which initially contacts the member. By increasing the speed of the lower member the thick stream is caused to move proportionately faster as is the thin stream.

In the foregoing specification and attached claims spiral or spirally relates to a curve formed by a point moving on a surface around an axis while continuously receding from (or approaching) it.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

We claim:

1. An apparatus comprising: a hopper, an orifice defining means in the bottom of the hopper through which a relatively thick stream of seeds may pass from said hopper, generally horizontally disposed means entirely disposed below said orifice and rotating about a generally vertical axis to progressively increase the velocity of said stream and to consequently thin said stream spirally shaped path defining means mounted between the horizontally disposed rotating means and orifice defining means, the center of the spiral being disposed adjacent the orifice and means to discharge the faster moving thin stream whereby the seeds may be relatively evenly planted.

2. A mechanism comprising: a seed hopper, means disposable in the bottom of said seed hopper and having a generally centrally located orifice through which a thick, slow moving stream of seeds may pass, rotatable means entirely disposed below said orifice defining means and adapted to receive said seeds and to progressively increase the velocity of said seeds, spiral path defining means held in fixed relation to said orifice defining means and located between said rotating means and said orifice defining means, the seeds on the rotating means initially contacting the spiral path defining means near its center, the seeds moving along said spiral path at progressively faster speeds and thinner streams.

3. The mechanism set forth in claim 2 in which said spiral path defining means is a flange carried by the orifice defining means.

4. A mechanism adapted to be used with a planter, a seed hopper, means normally operable to drive a seed plate, and a discharge opening in the bottom of the hopper; said mechanism comprising: a first rotatable member having a seed-engaging upper surface, said first member adapted to be driven by the drive means, a second member adapted to be held in a fixed position immediately above the first member, said second member being formed with a generally spirally extending path defining means on its lower surface, said second member being further provided with an aperture near its apical portion adapted to receive the seeds and cooperable with said spiral means to cause the seed to be carried in a gradually thinning and faster moving stream to the discharge point.

5. The mechanism set forth in claim 4 further characterized by said first rotatable member having radially extending grooves disposed in its seed-engaging upper surface.

6. The mechanism set forth in claim 4 in which the upper member is provided with an arch adapted to be engaged by a centering pin carried by the seed hopper.

7. The mechanism set forth in claim 4 in which the first member has a generally downwardly sloping surface from a centrally located apical portion.

8. A mechanism adapted to be used with an apparatus, a seed hopper, a rotatable drive plate in the bottom of the hopper, and a discharge opening in the bottom of the hopper adjacent the drive plate; said mechanism comprising a first rotatable member having a seed-engaging upper surface sloping from a centrally located apical portion, said first member adapted to be driven by said drive means, a second member adapted to be held in a fixed position immediately above the first member, said second member being formed with a generally spirally extending groove on its lower surface, said spiral groove adapted to be disposed in mating engagement with the upper surface of the lower member, said second member being further provided with a generally centrally located aperture through which seeds may pass.

9. The mechanism set forth in claim 8 in which radially extending grooves are provided on the upper surface of the lower member.

10. The mechanism set forth in claim 8 in which the upper member is provided with an arch that is adapted to engage a centering pin carried by the seed hopper.

11. The combination of a seed hopper having a centering pin, a rotatable drive plate mounted for rotation in the bottom of said hopper, a discharge opening in the bottom of the hopper adjacent the drive plate, a first rotatable member mounted on said drive plate for rotation therewith, said member having a seed engaging upper surface sloping from a centrally located apical portion, said upper surface having a plurality of radially extending grooves, and a second member mounted in said hopper immediately above said first member, said second member being formed with an arch which is disposed about the centering pin to hold said second member from rotation within the hopper, said second member also being formed with a generally spirally extending groove on its lower surface, said spiral groove being disposed in mating engagement with the upper surface of the lower member, and said second member being further provided with a generally centrally located aperture through which seeds may pass.

References Cited by the Examiner
UNITED STATES PATENTS

| | | |
|---|---|---|
| 1,332,993 | 3/1920 | Moore et al. 222—328 X |
| 2,279,640 | 4/1942 | Ringmarck. |
| 2,692,702 | 10/1954 | Church 222—328 X |
| 3,047,034 | 7/1962 | Sassmannshausen et al. 222—413 X |
| 3,135,517 | 6/1964 | Klema 275—12 |

LOUIS J. DEMBO, *Primary Examiner.*

RAPHAEL M. LUPO, *Examiner.*

N. L. STACK, *Assistant Examiner.*